UNITED STATES PATENT OFFICE.

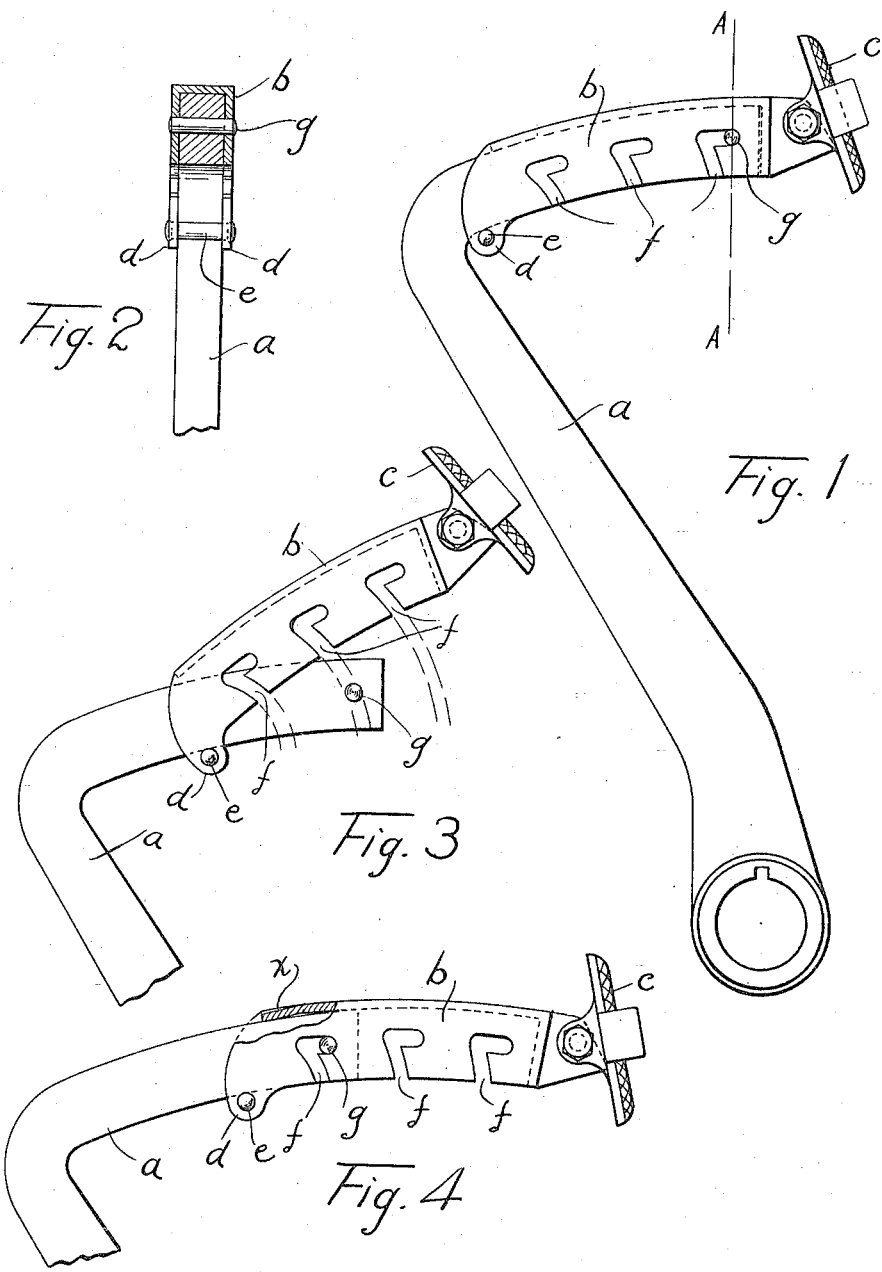

EDGAR J. BLOOM, OF TIFFIN, OHIO.

EXTENSION FOR PEDALS.

1,213,824.

Specification of Letters Patent.   Patented Jan. 30, 1917.

Application filed May 29, 1916.   Serial No. 100,549.

*To all whom it may concern:*

Be it known that I, EDGAR J. BLOOM, a citizen of the United States, residing at Tiffin, county of Seneca, State of Ohio, have invented a certain new and useful Improvement in Extensions for Pedals, and declare the following to be a full, clear, and exact description of the same, such as will enable others skilled in the art to which it pertains to make and use the same, reference being had to the accompanying drawings, which form a part of this specification.

This invention relates to extensions for pedals, especially the control pedals used on automobiles.

It has for its object a simple extension which may be quickly locked in selected positions without the necessity of unscrewing a nut or similar devices which require the aid of a tool.

Automobiles are very often used by members of a family who are of different height and have different lengths of legs. The result is the brake and clutch pedals that are convenient for one member of the family may be hard to reach by another member of the family or may be so long as to cramp the legs of one member of the family.

I am aware that extensions have heretofore been provided but they are not adapted for quick adjustment to meet the needs of different drivers of the same car.

In the drawings, Figure 1 is a side elevation of the control pedal of an automobile showing the extension in its position of shortest projection. Fig. 2 is a section on the line A—A of Fig. 1. Fig. 3 shows how the extension may be pivoted about the pedal lever to adjust it to its various selectable positions. Fig. 4 is a similar view to that shown in Fig. 1 but showing the extension in maximum projection.

*a* indicates the pedal lever which may be used to control the brake, clutch, gears, or any other part of an automobile requiring foot control.

*b* is an extension U-shaped in cross section and adapted to straddle the top of the pedal lever. This extension carries a pedal *c* at its outer end and is provided with a pair of lugs *d* at its inner end adapted to support the pin *e* which holds the extension to the pedal lever. The sides of the extension are provided with a plurality of bayonet slots *f* and the upper end of the pedal lever is provided with a cross pin *g* projecting on either side of the pedal lever for the purpose of engaging in the bayonet slots.

The extension may be slid onto the pedal lever before the transverse pin *g* is driven into and fixed in place. The extension is adapted to slide from the elbow of the pedal lever to the cross pin *g* when tipped as shown in Fig. 3, and may be swung down so that any one of the pair of selected bayonet slots *f* may be brought over the ends of the cross pin *g*. Thereupon the pedal may be pushed forward, driving the pin in the offset portions of the bayonet slot, and consequently locking the extension from any possible movement except longitudinally backward, which will not occur as the thrust of the foot tends to throw the extension forward.

From the above it will be seen that the position of the extension relative to the pedal lever can be almost instantly changed by simply pulling the extension backward, tipping the same upward and bringing the desired set of bayonet slots over the cross pin *g*.

This extension pedal may be used by manufacturers of cars to make possible the adjustment of the pedal lever to the needs of the prospective purchaser, and as already alluded to, may be used for the purpose of accommodating a car to several drivers whose needs are radically different.

I prefer to have one or more pieces of the metal in the top of the extension cut out on three sides to form lugs *x* which may be bent down to take up any looseness between the extension and the pedal lever due to defects in manufacture. This is quite an important feature as it makes the extension fit the pedal lever regardless of the size of the pedal lever within certain limits, and consequently the avoidance of rattling is successfully accomplished. These lugs may also be used to take up variations due to lack of precision in placing the pin *e*. In the drawings I have shown only one of these extensions but it is obvious that a plurality of them might be struck out of the top of the extension to take up any looseness all along the extension.

What I claim is:

1. The combination of a pedal lever provided with a projecting portion on its side, and an extension adapted to fit the pedal lever and provided with bayonet slots adapted to selectively engage the projection on the side of the pedal lever.

2. The combination of a pedal lever provided with a cross pin having projecting ends, and an extension in the form of a bar of U cross section provided in its sides with bayonet slots which can be selected to be brought into engagement with the ends of the cross pin to vary the projection of the extension on the pedal lever.

3. The combination of a pedal lever provided with a projection in its side, and a bayonet-slotted extension of U cross section straddling the top of the pedal lever and provided at its forward end with a pin adapted to engage under the pedal lever and at its rear end with the pedal, the said extension being adjustable upon the pedal lever by drawing the same rearwardly, swinging the same out of the bayonet slot and sliding the same along the pedal lever to bring the desired bayonet slot over the cross pin again.

4. The combination of a pedal lever provided with a projecting portion on its side, and an extension of U-shape cross section adapted to interlock with the pedal lever at selected positions, the said extension having one or more lugs cut out of the metal in its top for the purpose of taking up looseness when desired.

5. The combination with a foot lever provided with a part of a locking device, of an extension having both a sliding and a pivotal connection with the foot lever and provided with a plurality of locking device parts, the said extension being arranged to pivot on the pedal lever to cause one of its locking device parts to be disengaged from the pedal lever locking part and the said extension then being capable of being longitudinally slid along the pedal lever part to bring another locking part into engagement with the pedal lever locking part when the said extension is swung back to its initial angular position.

In testimony whereof, I sign this specification.

EDGAR J. BLOOM.

Copies of this patent may be obtained for five cents each, by addressing the "Commissioner of Patents, Washington, D. C."